INVENTOR.
Thomas G. Rogers
BY
Adams + Bush
ATTORNEYS

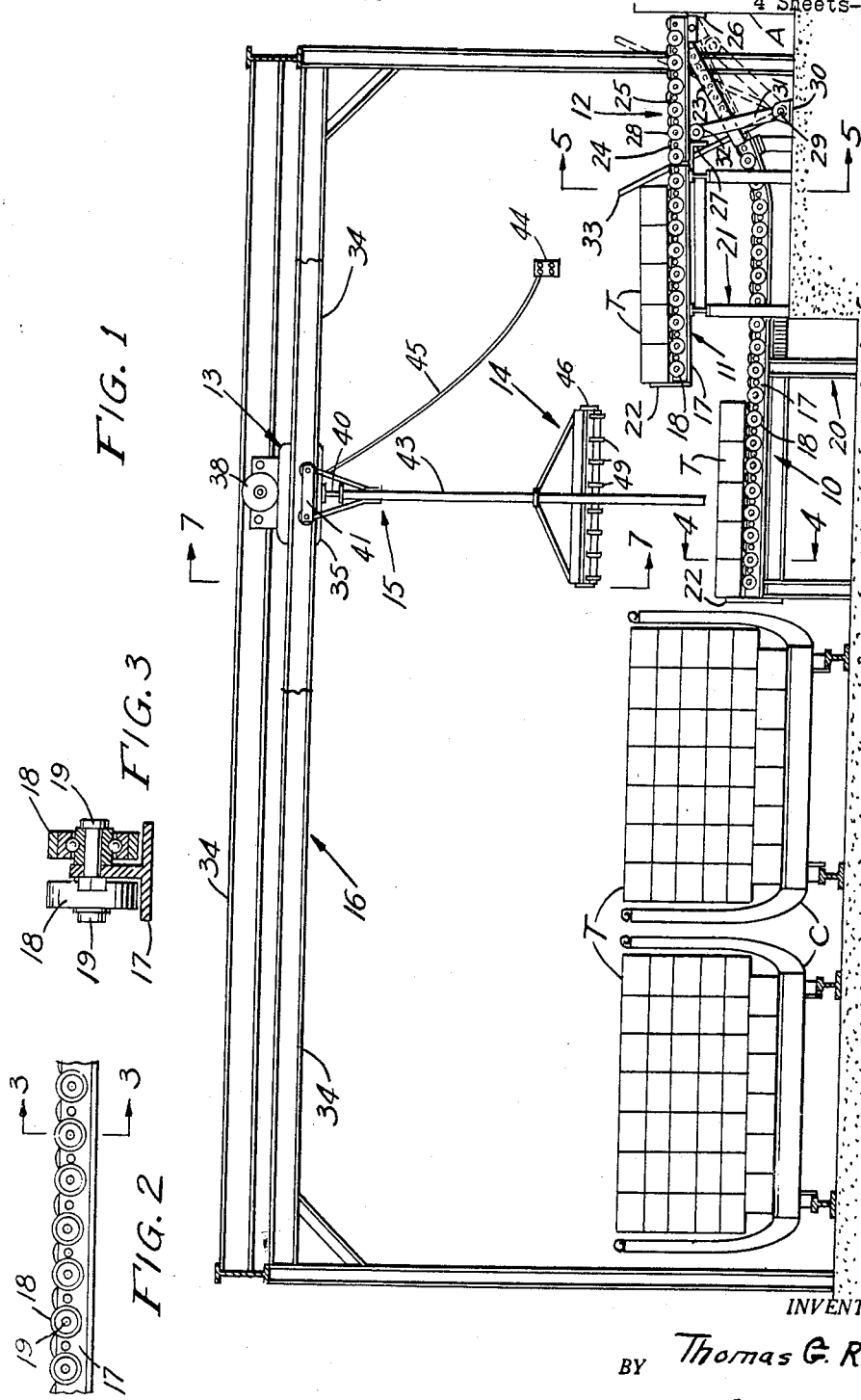

Dec. 16, 1958  T. G. ROGERS  2,864,516
APPARATUS FOR HANDLING CROSSTIES
Original Filed Oct. 4, 1955  4 Sheets-Sheet 3

INVENTOR.
Thomas G. Rogers
BY
Adams + Burk
ATTORNEYS

Dec. 16, 1958

T. G. ROGERS 2,864,516

APPARATUS FOR HANDLING CROSSTIES

Original Filed Oct. 4, 1955

INVENTOR.

BY Thomas G. Rogers

Adam + Burk

ATTORNEYS

United States Patent Office 2,864,516
Patented Dec. 16, 1958

2,864,516

APPARATUS FOR HANDLING CROSSTIES

Thomas G. Rogers, Chattanooga, Tenn., assignor to Southern Wood Preserving Company, Atlanta, Ga., a corporation of Georgia Original application October 4, 1955, Serial No. 538,386. Divided and this application December 7, 1956, Serial No. 627,057

3 Claims. (Cl. 214—41)

This invention relates to the handling of crossties in wood preserving plants and has more particular reference to apparatus for loading crossties on treatment trams as they are discharged from an adzing and boring machine.

In the process of producing finished treated crossties in wood preserving plants, the ties, after having been properly seasoned, are run through an adzing and boring machine and then loaded onto treatment trams for transportation to a treatment chamber where they are treated with a preservative to produce the finished treated product. The ties are graded or classified according to a predetermined standard as they are discharged from the adzing and boring machine and are loaded onto separate treating trams so that each tram will be loaded with ties all of the same predetermined grade or classification. Heretofore, it has been customary to manually pick up the ties after they have been graded and load them onto the proper treatment tram.

One object of the present invention is to provide novel apparatus for selectively loading crossties on treatment trams after the ties have been passed through an adzing and boring machine which eliminates the enormous amount of manual labor required according to the present methods of handling these heavy crossties.

Another object of the present invention is to provide a novel system for selectively loading crossties on treatment trams after the ties have passed through an adzing and boring machine in which each tie, after being discharged from the machine is delivered onto a selected one of a plurality of loading stations so that all ties received on a particular loading station will be of the same predetermined standard; and transferring the ties from the loading stations onto treatment trams, with each treatment tram receiving ties from one particular loading station, whereby the treatment trams, each loaded with ties all conforming to a predetermined standard, may be moved into the treating chamber.

Another object of the invention is to provide a novel system for selectively loading crossties on treatment trams after the ties have passed through an adzing and boring machine, as characterized above, wherein successive groups of ties are formed on each loading station with each group consisting of a plurality of parallel closely spaced ties; and successively transferring each group of ties, as formed on each loading station, as a unit, and depositing it on a treatment tram until a plurality of such units forming a complete load, have been deposited on the treatment trams, whereby each treatment tram, loaded with ties all conforming to a predetermined standard, may be moved into the treatment chamber.

Another object of the invention is to provide a system, as characterized above, wherein a plurality of elongated conveyors extending one above the other in vertically spaced relation are provided to receive the ties after they have passed through the adzing and boring machine, with each conveyor having its inner receiving end positioned adjacent the discharge end of the adzing and boring machine and its outer end extending substantially beyond the outer end of the conveyor immediately thereabove to form a loading station and wherein means including a switch conveyor are provided for selectively directing each tie as it is discharged from the adzing and boring machine onto a selected one of the conveyors.

Another object of the invention is to provide a system, as characterized above, including a traveling hoist mounted for back and forth movement on a track having its inner end portion extending over the loading stations on the conveyors and its outer end portion extending over a plurality of treatment trams positioned side by side on separate tracks.

A further object of the invention is to provide a system, as characterized above, wherein the traveling hoist carries a multiple hook grapple adapted to pick up a group of ties as a unit and transfer it from a loading station to a treatment tram, and wherein guide means are provided to guide the up and down movement of the grapple to prevent any sidewise swinging movement thereof.

Other objects and advantages of the invention will appear in the specification, when considered in connection with the accompanying drawings, wherein:

Fig. 1 is a side elevational view of one embodiment of apparatus and the arrangement thereof, constructed in accordance with the present invention;

Fig. 2 is a fragmentary side elevational view showing the details of the construction of a conveyor;

Fig. 3 is a vertical sectional view taken on the line 3—3 of Fig. 2;

Figure 4:
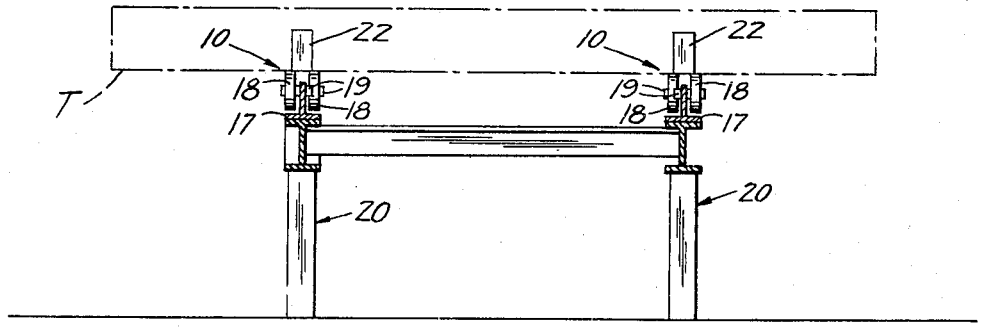
Fig. 4 is a vertical sectional view taken on the line 4—4 of Fig. 1.
Figure 5:
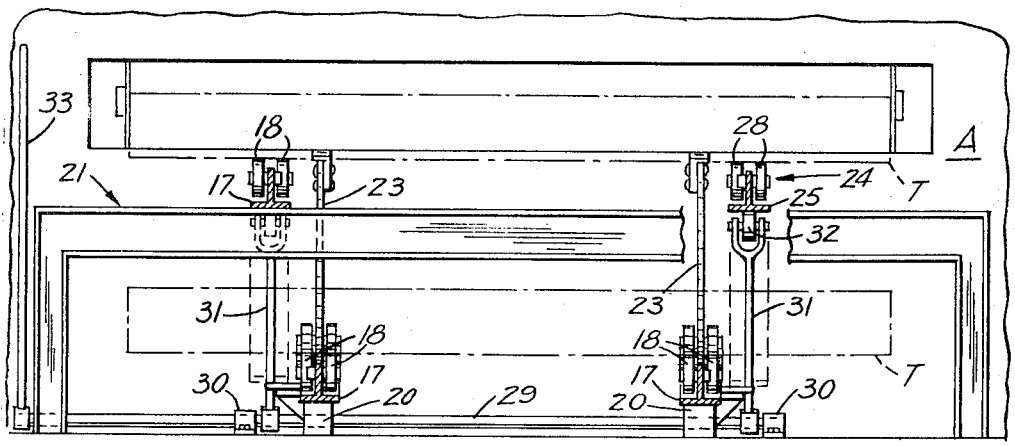
Fig. 5 is a vertical sectional view taken on the line 5—5 of Fig. 1, and with parts broken away to show details of the switch conveyor.
Figure 6:
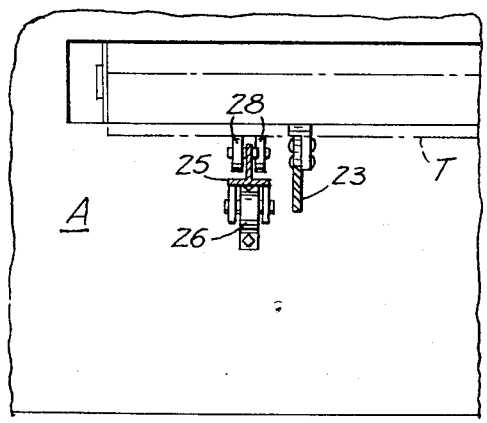
Fig. 6 is a fragmentary front elevational view showing details of the mounting of the selective mechanism for directing ties onto a selected conveyor.

This application is a division of my pending application Ser. No. 538,386, filed October 4, 1955, for Method of and Apparatus for Handling Crossties.

The present invention provides a novel system for selectively loading crossties on treatment trams after the ties have been passed through an adzing and boring machine and, in general, comprises a plurality of elongated conveyors extending one above the other in vertically spaced relation, with each conveyor having its inner receiving end positioned adjacent the discharge end of the adzing and boring machine and its outer end extending substantially beyond the outer end of the conveyor immediately thereabove to form a loading station; a selective switch device for selectively directing each tie as it is discharged from the adzing and boring machine onto a selected one of the conveyors; and a traveling hoist mounted for back and forth movement on a track having its inner end portion extending over the loading stations on the conveyors and its outer end portion extending over a plurality of treatment trams positioned side by side on separate tracks.

Referring now to the drawings, there is illustrated in Fig. 1, one embodiment of apparatus and the arrangement thereof constructed in accordance with the present invention. As there shown, the apparatus comprises a plurality of elongated conveyors, two such being shown and indicated generally at 10, 11; selective mechanism indicated generally at 12 for receiving each crosstie as it is discharged from the adzing and boring machine "A" and directing it onto any selected one of the conveyors for travel therealong to the outer end thereof; a traveling hoist, indicated generally at 13 and carrying a multiple hook grapple 14 for picking up crossties T; guiding mechanism, indicated generally at 15, for guiding the up and down movement of the grapple; and an overhead track system, indicated generally at 16, on which the traveling hoist and guide mechanism travel, having its inner end extending over the outer end portion of the conveyors and its outer end extending over a pair of treatment trams or cars C positioned side by side on parallel tracks.

While the conveyors 10 and 11 may be of any suitable usual type, in the particular embodiment of the invention illustrated, they are shown as being of the gravity type. The conveyors 10 and 11 are generally similar in construction and, as shown in Figs. 1, 2, 3 and 4, each comprises a spaced parallel pair of beams 17, with each beam carrying a plurality of idle rollers 18. The rollers 18 are mounted on stub shafts 19 extending through the web of the beam and with the successive rollers positioned on alternate sides of the web.

The lower conveyor 10 is mounted on a suitable framework, indicated generally at 20, with its inner receiving end positioned adjacent the discharge end of the adzing and boring machine and with its outer end extending substantially beyond the outer end of the upper conveyor 11.

The upper conveyor 11 is mounted on a suitable framework, indicated generally at 21, and extends above the lower conveyor 10 in vertically spaced relation thereto and with its inner receiving end positioned adjacent the discharge end of the adzing and boring machine.

Suitable stop means, such as vertical bars 22, are mounted at the outer ends of the conveyors, one on each end of the beams of the conveyors, to engage and hold the ties on the conveyors after they have traveled to the outer end portions thereof, thus forming loading stations on the outer end portions of the conveyors.

The selective mechanism, indicated generally at 12, for receiving each crosstie as it is discharged from the adzing and boring machine and directing it onto any selected one of the conveyors, is shown as comprising a laterally spaced pair of rigid, downwardly inclined slide bars 23 having their upper ends fixedly secured to the discharge end of the adzing and boring machine A and their lower ends positioned adjacent the inner ends, respectively, of the beams forming the lower conveyor 10; and a switch-like conveyor, indicated generally at 24. The bars 23 are so positioned that a crosstie discharged from the adzing and boring machine will extend transversely of the bars and slide by gravity, down onto the lower conveyor and travel therealong until it reaches and engages the stop at the loading station at the outer end of the conveyor. The inner end portions of the pair of beams forming the lower conveyor are curved upwardly to a point adjacent the ends of the slide bars to receive the ties as they leave the slide bars.

The switch-like conveyor 24 is shown as comprising a laterally spaced pair of parallel beams 25 having their upper ends pivotally mounted on lugs 26 fixedly mounted on the discharge end of the adzing and boring machine at points positioned outwardly of and slightly below the points of attachment of the slide bars 23 thereto and having their lower ends carrying a rigid depending stop member 27 and with each of the beams carrying a plurality of idle rollers 28 rotatably mounted on stub shafts extending through the web of the beam with the successive rollers positioned on alternate sides of the web.

The switch-like conveyor is adapted to be swung upwardly from an inoperative position, where it cannot engage the ties as they are discharged from the adzing and boring machine, to an operative position where it intercepts the ties as they slide down the slide bars 23 and deliver them onto the upper conveyor. When the switch-like conveyor is in its operative position, it will be downwardly inclined with its lower free end in substantial alignment with the inner receiving end of the upper conveyor 11, so that the ties will slide down the switch-like conveyor by gravity and travel across the upper conveyor to the loading station thereon.

Suitable means are provided for swinging the switch-like conveyor to and from its operative position. As shown, such means comprises an elongated rod 29 positioned below and extending transversely of the switch conveyor and rotatably journaled in suitable bearing members 30; a pair of laterally spaced parallel levers 31, each having its lower end fixedly attached to the rod 29 and carrying an idle roller 32 rotatably mounted on its upper end and positioned to engage the under surface of one of the beams 25 of the switch conveyor; and a handle operating lever 33 fixedly attached to the rod 29 for rotating the rod in its bearings to cause the levers 31 to move the switch conveyor from inoperative to operative position, where the upper ends of the levers 31 engage the depending stop members 27 on the outer ends of the beams 25 forming the switch conveyor.

The overhead track system 16 on which the traveling hoist 13 and the guide mechanism 14 for the grapple travel, is shown as comprising three laterally spaced parallel I beams 34. The ends of the track members 34 are supported by suitable structural mmebers and the track members are positioned so that their inner end portions extend over the loading stations on the two conveyors 10, 11 and their outer end portions extend over a pair of treatment trams positioned side by side on a parallel pair of tracks.

The traveling hoist 13 may be of any suitable usual type in which a reversible motor is employed to operate a winding drum. The traveling hoist 13 is shown as comprising a carriage 35 mounted for travel on the central one of the three I beams 34 by means of opposed pairs of rollers 36, 37, each suitably journaled on the carriage and positioned to engage the lower flanges of the I beam; a reversible motor 38 mounted on the carriage and connected to drive through suitable gearing the adjacent pair of rollers 36; the winding drum and the reversible motor and gearing for driving the drum are suitably mounted within the carriage and the two stretches of the cable between the winding drum and the anchored end thereof pass under the sheaves of the loading block 39 from which the grapple 14 is suspended.

The guiding mechanism for guiding the up and down movement of the grapple is shown as comprising an I beam 40 extending transversely of the track members 34 and carrying a suspension carriage 41 on each end having opposed pairs of rollers 42 mounted therein in position to ride on the lower flanges of the two outer I beam track members 34, and a pair of rigid vertical depending guide rods 43 carried by the beam 40, one fixedly attached to each end thereof.

The carriage 35 of the traveling hoist assembly is suitably rigidly connected to the transverse beam 40 so that the depending guide rods 43 will have translatory movement with the hoist and to provide additional support for the hoist, making the installation more sturdy and taking out the movement of the load which would occur without this additional support.

Suitable means are provided for controlling the operation of the traveling hoist. As shown, a suitable control panel carrying the necessary control push buttons and indicated generally at 44, is connected by flexible cables 45 to the two motors of the traveling hoist assembly to permit a single operator to control the travel of the hoist as well as the up and down movement of the grapple. In operation, the control panel is strapped around the waist of the operator, permiting him freedom of movement.

The multiple hook grapple 14 may be of any suitable usual type. Preferably, and as shown, the grapple is generally similar to the grapple shown in U. S. Patent No. 2,403,346, issued July 2, 1946, to A. M. Deiters, for Grapple for Handling Crossties and the Like. As shown, the grapple comprises a generally rectangular main frame composed of opposite side angles 46 connected at their ends by end angles 47 and carrying fixed transverse shafts 48 near their opposite ends on which are pivotally mounted a series of L-shaped hooks 49 having spacing hubs 50 on the shaft, the arrangement being such that the hooks can swing freely and independently of the shaft.

Figure 7:
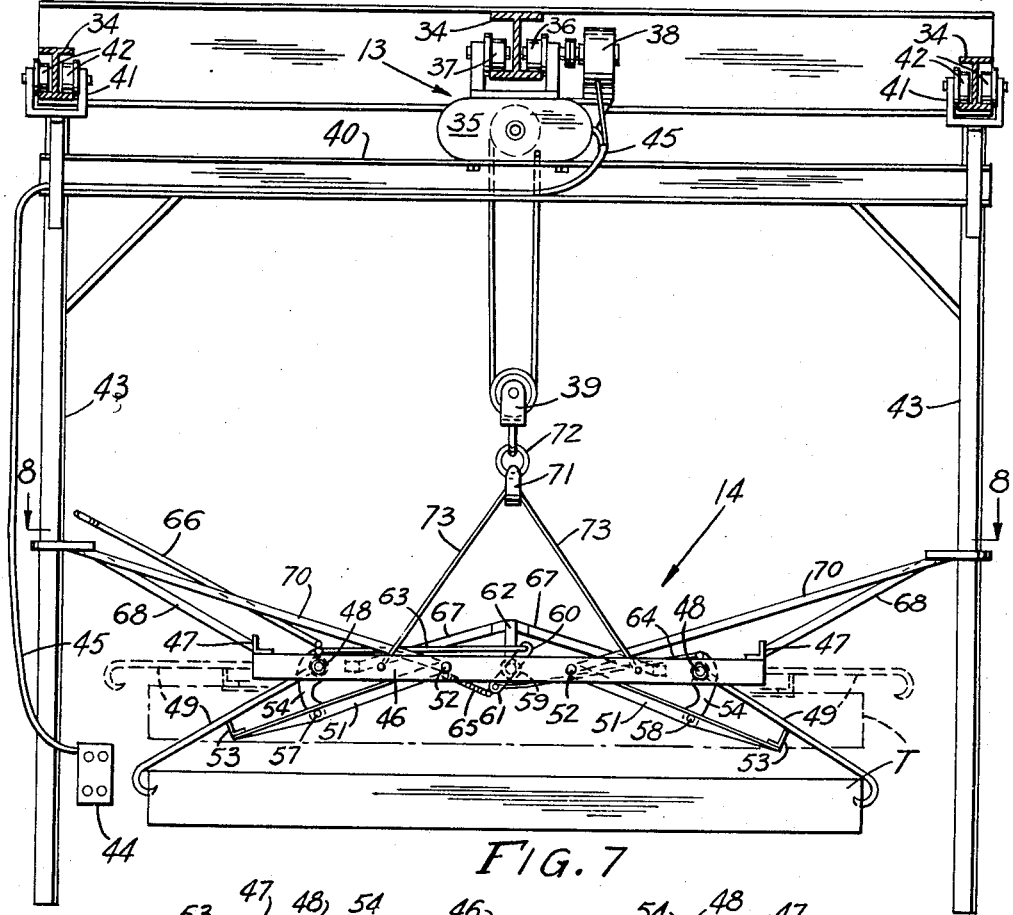
Fig. 7 is a vertical sectional view taken on the line 7—7 of Fig. 1.
Figure 8:
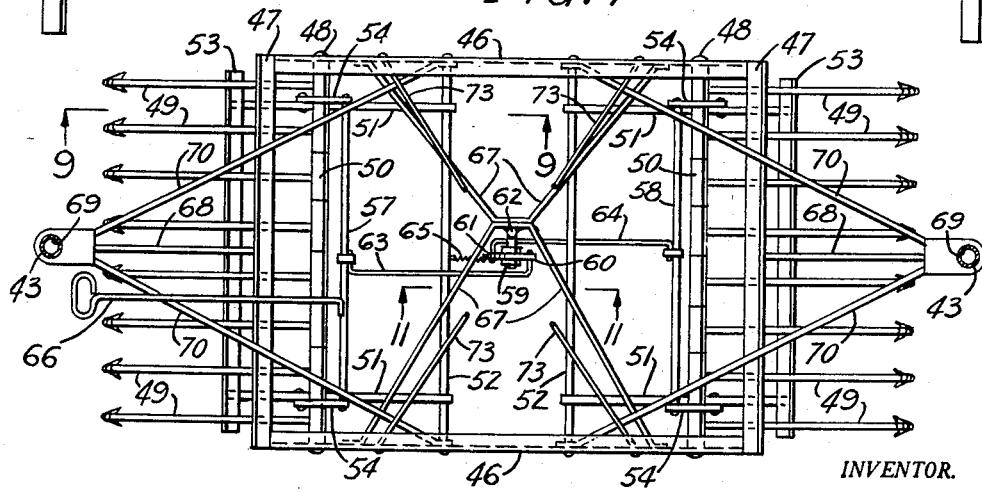
Fig. 8 is a plan view of the grapple.
Figure 9:
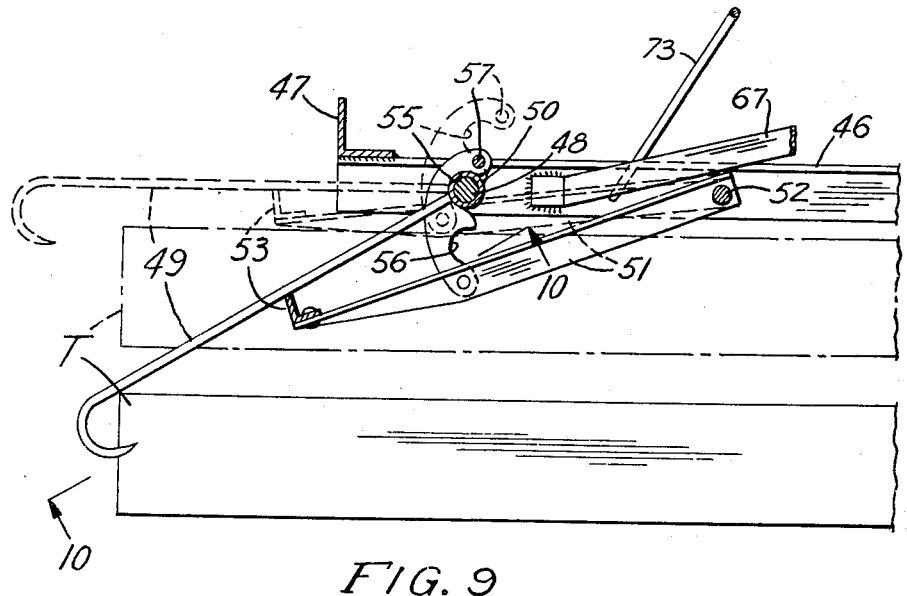
Fig. 9 is a vertical sectional view taken on the line 9—9 of Fig. 8.
Figure 10:
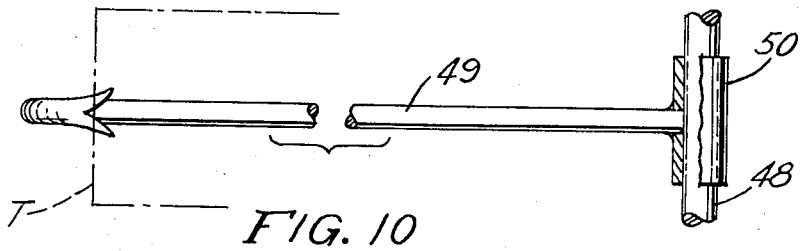
Fig. 10 is a bottom plan view with parts broken away, showing a grapple hook.
Figure 11:
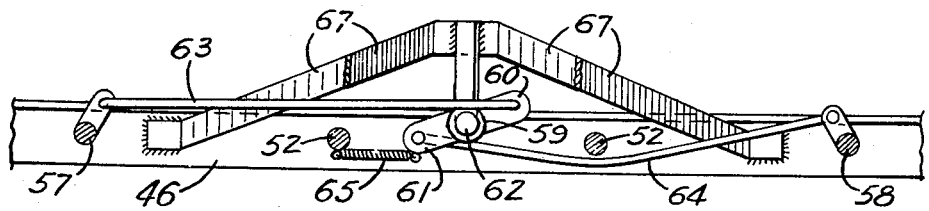
Fig. 11 is a vertical sectional view taken on the line 11—11 of Fig. 8.

It will be noted that the hooks in their raised or open position, as shown in dotted lines in Fig. 7, extend beyond the ends of the crossties. They are adapted to be held or retained in this position by means of bail-shaped members comprising bail arms 51, mounted on transverse shafts 52 extending across the main frame and these arms carry transverse angle members 53 having upstanding flanges adapted to engage the underside of the arms of the hooks 49. Each of the bail arms 51 is shown as carrying a pivoted latch element 54 having two notches 55, 56 adapted to swing into latching engagement with the hubs 50 of the side hooks on the shafts 48. In Figs. 7 and 9, the latch elements are shown in dotted lines as being engaged to hold the hooks in their raised or open position, and shown in full lines, with the upper notches of the latch elements engaging the hubs of the side hooks to limit the downward swinging movement of the bails to prevent the grapple hooks from swinging downwardly to a vertical position, but permitting all of the grapple hooks to swing downwardly a sufficient distance to engage the ends of the cross ties. The latch members are preferably made of metal and curved inwardly, as shown, to facilitate operation. Suitable means are provided for an operator to release the latches from their raised to open position. As shown, such means comprises a pair of rods 57, 58, each connecting the pair of latch elements on one end of the frame assembly so that the connected latches may be operated together to raise or lower the bail on which they are mounted; a hub member 59 carrying oppositely extending toggle arms 60, 61 mounted on a shaft 62; an operating link 63 having one of its ends pivotally connected to a lug on the rod 57 and the other of its ends pivotally connected to the outer end of the toggle arm 60; an operating link 64 having one of its ends pivotally connected to a lug on the rod 58 and the other of its ends pivotally connected to the outer end of the toggle arm 61; a coil spring 65 having one end connected to the outer end of the toggle arm 61 and the other end connected to one of the shafts 52 to normally bias the toggle and latches to latching position to hold the grapple hooks in their raised or open position; and an operating handle 66 having its inner end rigidly connected to the rod 57 for manually unlatching the latches against the pull of the spring 65.

The shaft 62, on which the hub member 59 carrying the toggle arm is mounted, may be mounted on the grapple frame in any suitable manner. As shown, the shaft 62 is an L-shaped stub shaft having its vertical leg secured to a suspension frame composed of strap metal elements 67 connected to the side angles of the main frame and extending upwardly to a point above the center of the main frame.

Suitable means are provided for engaging the depending guide rods 43 for guiding the up and down travel of the grapple to prevent any swinging movement thereof. As shown, such means comprises a pair of opposed laterally and upwardly extending guide arms 68 each having its lower end secured to one of the end frame members 47 and having an opening 69 formed in its outer end to receive one of the guide rods 43. The guide arms 68 are suitably braced, as by bracing members 70 secured at their lower ends to the side frame members 46.

The grapple 14 may be suspended from the loading block 39 of the traveling hoist by any suitable means. As shown, such means comprise a plate 71 carrying a ring 72 engaging the hook on the loading block and four cables 73 each connected at its lower end to one of the outer end portions of the side frame members 46 to form a hoisting bridle.

The manner in which the apparatus comprising the system is operated is believed apparent.

As each crosstie is discharged from the adzing and boring machine, the operator who controls the switch conveyor will operate it to direct the tie onto the lower or upper conveyor, depnding upon to which of predetermined standards of grade or classification the tie conforms. This is accomplished by leaving the conveyor switch in inoperative position for ties to be sent onto the lower conveyor and moving it to operative position for ties to be sent onto the upper conveyor. After a group of ties has been formed on the loading station of any one of the conveyors, the group, consisting of a plurality of parallel, closely spaced ties, is picked up by the grapple carried by the traveling hoist and deposited on one of the treatment trams.

Only two operators are required to operate the system, one to control the switch conveyor and one, wearing the control panel 44, to control the operation of the traveling hoist and the up and down travel of the grapple and to release the hooks of the grapple by operating the handle 66 of the latching mechanism when the grapple is in position to grab a group of ties on a loading station.

All of the hooks of the grapple automatically engage the ends of the ties, ice-tong fashion, and, as the grapple moves upwardly will pick them up. The operator will then follow the load to the treatment tram on which the ties are to be loaded. When the load is to be released the grapple is lowered until one or more of the ties come to rest on the tram. As the grapple is further lowered, the bail members will engage and ride upon the top surfaces of the ties and swing upwardly, thereby disengaging the upper notches of the latch members from their latched or suspended position, as shown in solid lines in Figs. 7 and 9, and swing the latches upwardly so that the spring-urged toggle arms will retract all of the latches and cause their lower notches to engage the hubs of the hooks, as shown in dotted lines in Fig. 9. At the same time, the upper edges of the bail angles 53 will engage the arms of all of the hooks and swing them upwardly out of engagement with the ties. Then, the grapple is ready to be carried by the traveling hoist into position to pick up another load. Thus, the tie releasing operation is entirely automatic, the operator only being required to release the latches so that the hooks can engage the ties when the grapple is in position to pick up a load of ties.

From the foregoing, it readily will be seen that there has been provided novel and improved apparatus for handling crossties as they are discharged from an adzing and boring machine to selectively load the ties on treatment trams, according to their grade or classification, for removal to the treatment chamber, which eliminates the enormous amount of manual labor normally required in loading the ties on the treatment trams and greatly increases the efficiency and rate of the loading process.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A system for handling crossties as they are discharged from an adzing and boring machine to selectively load the ties on treatment trams so that each tram will be loaded with ties conforming to a predetermined standard, comprising, in combination, a pair of elongated conveyors extending one above the other in vertically spaced relation with their inner receiving ends positioned adjacent the discharge end of the adzing and boring machine to receive the ties as they are discharged from the machine, so that the ties extend transversely of the conveyors, and with the outer end of the lower conveyor extending substantially beyond the outer end of the upper conveyor; stop means positioned adjacent the outer end of each conveyor to hold the ties on the conveyor as they reach the outer end portion so that the outer end portions of the conveyors form loading stations; selective means positioned at the discharge end of the adzing and boring machine and operable to direct a tie as it is discharged from the machine onto any one of said conveyors including a laterally spaced pair of rigid downwardly inclined slide bars having their upper ends attached to the discharge end of the adzing and boring machine and their lower ends positioned adjacent the inner receiving end of the lower conveyor, said bars being so positioned that a tie discharged from the machine will extend transversely of the bars and slide down onto the lower conveyor, and a switch-like conveyor having its inner end pivotally attached to the discharge end of the adzing and boring machine and swingable from an inoperative position out of engagement with a crosstie as it slides down said bars into an operative position where it engages a tie as it slides down said bars and directs the tie onto the upper conveyor, said switch-like conveyor including a laterally spaced parallel pair of elongated beams having a plurality of idle rollers mounted thereon and positioned to engage a crosstie as it travels along the switch-like conveyor, each of said beams having its upper end pivotally connected to the discharge end of the adzing and boring machine at a point spaced below and outwardly of the point of attachment of one of said slide bars thereto; manually operable means for swinging said beams about their pivotal axis to move the switch-like conveyor from its inoperative position to its operative position, said manually operable means including a rotatable rod positioned below and extending transversely of said switch-like conveyor; a laterally spaced parallel pair of levers having their lower ends fixedly secured to said rod and with their upper ends carrying an idle roller positioned to engage the underside of one of the beams of the switch-like conveyor; a handle lever fixedly connected to said rod for rotating it to cause said beams to move the switch-like conveyor from one position to another; and hoisting means for picking up the ties from the loading stations and loading them onto treatment trams for conveyance to the treating chamber.

2. A system for handling crossties as they are discharged from an adzing and boring machine to selectively load the ties on treatment trams so that each tram will be loaded with ties conforming to a predetermined standard, comprising, in combination, a pair of elongated conveyors extending one above the other in vertically spaced relation with their inner receiving ends positioned adjacent the discharge end of the adzing and boring machine to receive the ties as they are discharged from the machine so that the ties extend transversely of the conveyors, and with the outer end of the lower conveyor extending substantially beyond the outer end of the upper conveyor; stop means positioned adjacent the outer end of each conveyor to hold the ties on the conveyor as they reach the outer end portion so that the outer end portions of the conveyors form loading stations; selective means positioned at the discharge end of the adzing and boring machine and operable to direct a tie as it is discharged from the machine onto any one of said conveyors; and hoisting means for picking up the ties from the loading stations and loading them onto treatment trams for conveyance to the treating chamber, said hoisting means including a traveling hoist mounted for back and forth movement on a track and carrying a multiple hook grapple adapted to pick up a plurality of crossties at a time and unload them on a treatment tram, said track being mounted so that its inner end portion extends over the loading stations on said conveyors and its outer end portion extends over a pair of trams positioned side by side on separate tracks.

3. A system as set forth in claim 2, including a laterally spaced pair of carriages positioned on opposite sides of said traveling hoist, each mounted for back and forth movement on a track parallel to the track on which said traveling hoist is mounted, and carrying a depending vertical guide rod and means connecting said carriages to said traveling hoist for traveling movement therewith and wherein said grapple carries a pair of opposed laterally extending guide arms each having an opening formed in its outer end to receive one of said guide rods, the construction and arrangement being such that the up and down movement of said grapple will be guided by said guide rods, thereby eliminating any sidewise swinging movement thereof.

References Cited in the file of this patent

UNITED STATES PATENTS

| | | |
|---|---|---|
| 1,236,089 | Kendall | Aug. 7, 1917 |
| 1,384,393 | Luce | July 12, 1921 |
| 1,490,235 | Smith et al. | Apr. 15, 1924 |
| 1,627,656 | Luce | May 10, 1927 |
| 1,971,339 | Fitch | Aug. 28, 1934 |
| 2,310,160 | Cohen | Feb. 2, 1943 |
| 2,613,825 | Setzer et al. | Oct. 14, 1952 |
| 2,693,287 | Anguera | Nov. 2, 1954 |
| 2,711,831 | Olson | June 28, 1955 |
| 2,750,054 | McBride | June 12, 1956 |